(12) United States Patent
Chowdhry et al.

(10) Patent No.: US 7,683,145 B2
(45) Date of Patent: *Mar. 23, 2010

(54) METHOD FOR THE EMULSION POLYMERIZATION OF OLEFINS

(75) Inventors: Mubarik Mahmood Chowdhry, Strasbourg (FR); Markus Schmid, Deidesheim (DE); Peter Preishuber-Pfluegl, Ludwigshafen (DE); Xavier Sava, Mannheim (DE); Horst Weiss, Neuhofen (DE); Stefan Mecking, Freiburg (DE); Florian M. Bauers, Freiburg (DE)

(73) Assignee: BASF SE, Ludwigshafen (DE)

( * ) Notice: Subject to any disclaimer, the term of this patent is extended or adjusted under 35 U.S.C. 154(b) by 669 days.

This patent is subject to a terminal disclaimer.

(21) Appl. No.: 10/521,117

(22) PCT Filed: Jul. 16, 2003

(86) PCT No.: PCT/EP03/07683

§ 371 (c)(1),
(2), (4) Date: Jan. 12, 2005

(87) PCT Pub. No.: WO2004/013185

PCT Pub. Date: Feb. 12, 2004

(65) Prior Publication Data

US 2005/0261452 A1    Nov. 24, 2005

(30) Foreign Application Priority Data

Jul. 25, 2002   (DE) ................................ 102 34 005

(51) Int. Cl.
C08F 4/00       (2006.01)
C08F 2/00       (2006.01)

(52) U.S. Cl. .......................... 526/90; 526/204; 526/208; 526/233

(58) Field of Classification Search ............... 526/90, 526/204, 208, 233, 142, 172, 348; 502/103, 502/125
See application file for complete search history.

(56) References Cited

U.S. PATENT DOCUMENTS 3,635,937 A    1/1972   Bauer et al.

(Continued)

FOREIGN PATENT DOCUMENTS

DE          29 23 206        12/1980

(Continued)

OTHER PUBLICATIONS

Bauers et al., "Catalytic Polymerization of Ethylene in Aqueous Emulsion With a Simple in Situ Catalyst", Macromolecules, vol. 36, pp. 6711-6715, 2003, XP002259050.*

(Continued)

*Primary Examiner*—William K Cheung
(74) *Attorney, Agent, or Firm*—Oblon, Spivak, McClelland, Maier & Neustadt, L.L.P.

(57) ABSTRACT

A method for the emulsion polymerization of one or more olefins by reacting a ligand of general formulae Ia and Ib or a mixture of at least two ligands Ia or Ib, wherein R respectively represents one or several of the following radicals; hydrogen, halogen, nitrile, $C_1$-$C_{12}$-alkyl groups, $C_1$-$C_{12}$-alkoxy groups, $C_7$-$C_{13}$-aralkyl groups, C6-C14-aryl groups, and wherein identical or different compounds of general formulae Ia and Ib can, optionally, be concatenated by one or several bridges, with a phosphine compound PR3' and a metal compound of general formula $M(L^2)_2$ or $M(L^2)_2 (L^1)_z$, wherein the variables are defined as follows: M is a transition metal of groups 7-10 in the periodic system of the elements; $L^1$ represents phosphanes $(R^5)_x PH_{3-x}$ or amines $(R^5)_x NH_{3-x}$ with identical or different radicals $R^5$, ether $(R^5)_2 O$, $H_2 O$, alcohols $(R^5)OH$, pyridine, pyridine derivatives of formula $C_5 H_{5-x}(R^5)_x N$, CO, $C_1$-$C_{12}$-alkylnitriles, $C_6$-$C_{14}$-arylnitriles or ethylenically unsaturated double bond systems, wherein x is a whole number ranging from 0-3, $L^2$ represents halogenide ions $R^6_x NH_{3-x}$, wherein x is a whole number ranging from 0 3 and $R^6$ represents $C_1$-$C_{12}$-alkyl, and $C_1$-$C_6$-alkylane ions, allylane ions, benzylane ions or arylane ions, wherein $L^1$ and $L^2$ can be concatenated with each other by one or several covalent bonds, z is a number ranging from 0 4. The invention also relates to the immediate use of the reaction product in the polymerization or copolymerization of olefins in water or in a solvent mixture containing at least 50 vol. % water in the presence of an emulsifier and, optionally, in the presence of an activator.

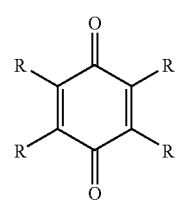

Ia

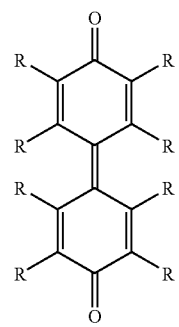

Ib

11 Claims, No Drawings

U.S. PATENT DOCUMENTS

| | | | |
|---|---|---|---|
| 3,686,159 | A | 8/1972 | Bauer et al. |
| 4,698,403 | A | 10/1987 | Klabunde |
| 4,716,205 | A | 12/1987 | Klabunde |
| 5,574,091 | A | 11/1996 | Walther et al. |
| 5,686,542 | A * | 11/1997 | Ostoja-Starzewski et al. . 526/75 |

FOREIGN PATENT DOCUMENTS

| | | | |
|---|---|---|---|
| DE | 33 45 785 | 6/1985 | |
| DE | 34 45 090 | 6/1986 | |
| EP | 0 046 328 | 2/1982 | |
| EP | 0 046 331 | 2/1982 | |
| EP | 0 137 389 | 4/1985 | |
| EP | 1 110 977 | 6/2001 | |
| WO | 97/17380 | 5/1997 | WO |
| 98/42664 | | 10/1998 | WO |
| 01/44325 | | 6/2001 | WO |
| WO 0144325 | | * 6/2001 | WO |
| 03/006528 | | 1/2003 | |

OTHER PUBLICATIONS

U.S. Appl. No. 10/579,098, filed May 12, 2006, Chowdhry, et al.

Bauers, Florian M. et al. "Catalytic Polymerization of Ethylene in Aqueous Emulsion with a Simple in Situ Catalyst", Macromolecules, vol. 36, No. 18, pp. 6711-6715 2003.

Teyssie, Philippe et al. "Polymerization by transition metal derivatives. III. Competitive effect of various ligands on stereospecific polymerization of butadiene by rhodium salts in aqueous emulsion", Bulletin de la Societe Chimique de France, No. 10, pp. 2842-2848 1965.

Berger, Richard S. et al. "Emulsion Polymerization of Vinyl Monomers by Transition Metal Compounds", Journal of Polymer Science: Part A, vol. 2, No. 1, part A, pp. 357-365 1964.

Brintzinger, Hans H. et al. "Stereospecific Olefin Polymerization with Chiral Metallocene Catalysts", Angew. Chem. Int. Ed. Engl., vol. 34, pp. 1143-1170 1995.

Wang, Lin et al. "Coordination Polymerization of Ethylene by Single-Component Rhodium Catalysts in Protic Solvents", J. Am. Chem. Soc., vol. 115, pp. 6999-7000 1993.

Johnson, Lynda K. et al. "New Pd(II)- and Ni(II)-Based Catalysts for Polymerization of Ethylene and alpha-Olefins", J. Am. Chem. Soc., vol. 117, pp. 6414-6415 1995.

* cited by examiner

METHOD FOR THE EMULSION POLYMERIZATION OF OLEFINS

BACKGROUND OF THE INVENTION

1. Field of the Invention

The present invention relates to a process for the emulsion polymerization of one or more olefins by reacting a ligand of the formula Ia or Ib or a mixture of at least two of the ligands Ia or Ib

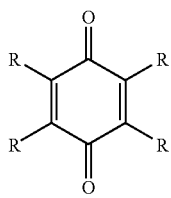

Ia

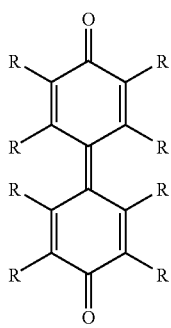

Ib in each of which R denotes one or more of the following radicals:

hydrogen halogen nitrile $C_1$-$C_{12}$ alkyl, $C_1$-$C_{12}$ alkoxy, $C_7$-$C_{13}$ aralkyl, $C_6$-$C_{14}$ aryl groups, unsubstituted or substituted by: $C_1$-$C_{12}$ alkyl groups, halogens, $C_1$-$C_{12}$ alkoxy, $C_3$-$C_{12}$ cycloalkyl, $C_1$-$C_{12}$ thioether groups, carboxyl groups or sulfo groups present where appropriate in the form of their salts, and also amino groups with hydrogen and/or $C_1$-$C_{12}$ alkyl radicals amino groups $NR^1R^2$, where $R^1$ and $R^2$ together or separately are hydrogen, $C_1$-$C_{12}$ alkyl, $C_7$-$C_{13}$ aralkyl or $C_6$-$C_{14}$ aryl groups and may additionally form a saturated or unsaturated 5- to 10-membered ring, unsubstituted or substituted by: $C_1$-$C_{12}$ alkyl groups, halogens, $C_1$-$C_{12}$ alkoxy, $C_3$-$C_{12}$ cycloalkyl, $C_1$-$C_{12}$ thioether groups, carboxyl groups or sulfo groups present where appropriate in the form of their salts, and also amino groups with hydrogen and/or $C_1$-$C_{12}$ alkyl radicals and where identical or different compounds of the formulae Ia and Ib may where appropriate also be bridged by one or more $C_1$-$C_{12}$ alkylene, $C_2$-$C_{12}$ alkylated azo or formula II bridges

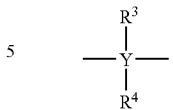

II where Y is silicon or germanium and $R^3$ and $R^4$ are hydrogen and/or $C_1$-$C_{12}$ alkyl, with a phosphine compound $PR'_3$, where R' is hydrogen, $C_1$-$C_{12}$ alkyl, $C_4$-$C_{12}$ cycloalkyl, $C_7$-$C_{15}$ aralkyl or $C_6$-$C_{15}$ aryl groups, or with a diphosphine compound $R'_2P$-$G$-$PR'_2$, where R' is as defined for the phosphine compounds $PR'_3$ and G is $C_1$-$C_{12}$ alkyl, $C_4$-$C_{12}$ cycloalkyl, $C_7$-$C_{15}$ aralkyl or $C_6$-$C_{15}$ aryl groups, and also with a metal compound of the formula $M(L^2)_2$ or $M(L^2)_2(L^1)_z$, where the variables are defined as follows:

M is a transition metal from groups 7 to 10 of the Periodic System of the Elements;

$L^1$ is phosphanes $(R^5)_xPH_{3-x}$ or amines $(R^5)_xNH_{3-x}$ with identical or different radicals $R^5$, ethers $(R^5)_2O$, $H_2O$, alcohols $(R^5)OH$, pyridine, pyridine derivatives of the formula $C_5H_{5-x}(R^5)_xN$, CO, $C_1$-$C_{12}$ alkyl nitrites, $C_6$-$C_{14}$ aryl nitriles or ethylenically unsaturated double bond systems, x being an integer from 0 to 3, $R^5$ is hydrogen, $C_1$-$C_{20}$ alkyl groups, which may in turn be substituted by $O(C_1$-$C_6$ alkyl) or $N(C_1$-$C_6$ alkyl)$_2$ groups, $C_3$-$C_{12}$ cycloalkyl groups, $C_7$-$C_{13}$ aralkyl radicals, and $C_6$-$C_{14}$ aryl groups, $L^2$ is halide ions, $R^6{}_xNH_{3-x}$, where x is an integer from 0 to 3 and $R^6$ is $C_1$-$C_{12}$ alkyl, and also $C_1$-$C_6$ alkyl anions, allyl anions, benzyl anions or aryl anions, it being possible for $L^1$ and $L^2$ to be linked to one another by one or more covalent bonds, z is a number from 0 to 4, and using the reaction product immediately to polymerize or copolymerize olefins in water or a solvent mixture with a water content of at least 50% by volume in the presence of an emulsifier and, optionally, of an activator.

The complex formed in situ does not undergo isolation and purification.

For the process of the invention it is optional to use an activator such as, for example, olefin complexes of rhodium or of nickel. This invention further relates to dispersions of polyolefins such as polyethylene and ethylene copolymers in water, to the use of the aqueous dispersions of the invention for paper applications such as paper coating or surface sizing, paints, adhesive base materials, foam moldings such as mattresses, applications to textiles and leather, coatings on carpet backings, or pharmaceutical applications.

2. Description of the Background

Aqueous dispersions of polymers are utilized commercially in numerous, very different applications. Examples include paper applications (coating and surface sizing), base materials for paints and varnishes, adhesive base materials (including pressure sensitive adhesives), applications to textiles and leather, chemicals used in the construction industry, foam moldings (mattresses, coatings for carpet backings), and also for medical and pharmaceutical products, as binders for preparations, for example. A summary can be found in D. Distler (editor) "WäBrige Polymerdispersionen", Wiley-VCH Verlag, 1st edition, 1999.

To date it has been difficult to prepare aqueous dispersions of polyolefins. It would, however, be desirable to be able to prepare such aqueous dispersions of polyolefins, since the monomers such as ethylene or propylene are very advantageous from an economic standpoint.

The commonplace processes for preparing such aqueous dispersions from the corresponding olefins make use either of free-radical high-pressure polymerization or else of the preparation of secondary dispersions. These processes are hampered by disadvantages. The free-radical polymerization processes require extremely high pressures, are restricted to ethylene and ethylene copolymers on the industrial scale, and involve an apparatus which is very expensive to purchase and maintain. Another possibility is first to polymerize ethylene, by any desired process, and then to prepare a secondary dispersion, as described in U.S. Pat. No. 5,574,091. This method is a multistage process and hence is very cumbersome.

It is therefore desirable to polymerize 1-olefins such as ethylene or propylene under the conditions of emulsion polymerization and to prepare the required dispersion in one step from the corresponding monomer. Moreover, emulsion polymerization processes have the advantage, very generally, that they give polymers of high molar mass, the removal of heat being easy to manage as an inherent feature of the process. Lastly, reactions in aqueous systems very generally are of interest, on account of the fact that water is an inexpensive and environmentally friendly solvent.

Processes proposed to date for the emulsion polymerization of 1-olefins such as ethylene or propylene require further improvement. The problem generally resides in the catalyst which is needed to polymerize these monomers.

With electrophilic transition metal compounds such as $TiCl_4$ (Ziegler-Natta catalyst) or metallocenes it is possible to polymerize olefins, as described, for example, by H.-H. Brintzinger et al. in Angew. Chem., Int. Ed. Engl. 1995, 34, 1143. However, both $TiCl_4$ and metallocenes are sensitive to moisture and are therefore poorly suited to preparing polyolefins in emulsion polymerization. The aluminum alkyl cocatalysts used are also sensitive to moisture; accordingly, water, as a catalyst poison, must be carefully excluded.

There are but few reports of transition metal catalyzed reactions of ethylene in aqueous medium. For instance, L. Wang et al. in J. Am. Chem. Soc. 1993, 115, 6999 report a rhodium catalyzed polymerization. At around one insertion per hour, however, the activity is much too low for industrial applications.

The reaction of ethylene with nickel-P,O-chelate complexes appears much more promising, as it is described in U.S. patents U.S. Pat. No. 3,635,937 and U.S. Pat. No. 3,686,159. The polymer analysis data are not reported. Additionally, the reported activity is still much too low for industrial applications.

EP-A 0 046 331 and EP-A 0 046 328 report the reaction of ethylene with Ni-chelate complexes of the formula A

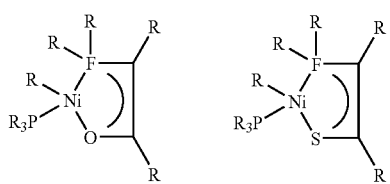

A where R refers to identical or different organic substituents of which one carries a sulfonyl group and F denotes phosphorus, arsenic or nitrogen. The selected reaction conditions in solvents such as methanol or mixtures of methanol and a hydrocarbon produced only oligomers, which are not suitable for the applications specified above.

U.S. Pat. No. 4,698,403 (column 7, lines 13-18) and U.S. Pat. No. 4,716,205 (column 6, lines 59-64) show that an excess of water acts as a catalyst poison to bidentate Ni-chelate complexes, even when they carry an $SO_3^-$ group.

From the documents cited above it is apparent that numerous Ni complexes are not active in polymerization in the presence of water.

Furthermore, WO 97/17380 discloses that palladium compounds of the formula B

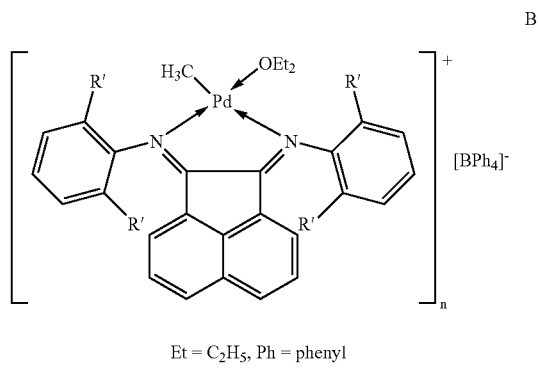

B

Et = $C_2H_5$, Ph = phenyl where R' stands, for example, for isopropyl groups, or the analogous nickel compounds, are able to polymerize higher olefins such as 1-octene in an aqueous environment. An option is to add an emulsifier, in order to facilitate the polymerization. Nevertheless, it is specified that the temperature of 40° C. should not be exceeded, since otherwise the catalyst is deactivated (p. 25, lines 5 et seq.). Higher reaction temperatures, however, are generally desirable, since they allow the activity of a catalyst system to be increased.

Further drawbacks of formula B catalyst systems are that, with ethylene, highly branched polymers are generally formed (L. K. Johnson, J. Am. Chem. Soc. 1995, 117, 6414), which have been of little significance industrially to date, and that, with higher α-olefins, the phenomenon known as "chain running" is inevitably observed in the active complexes. Chain running leads to a large number of 1,ω-misinsertions, as a result of which, generally, amorphous polymers are produced, which are poorly suited to use as materials of construction.

It is also known that complexes of the formula C

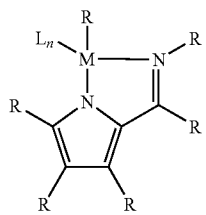

C (WO 98/42665), where M=Ni or Pd, having n neutral ligands L, are active in polymerization in the presence of small amounts of water without detriment to the catalytic activity (page 16, line 13). These amounts of water, however, must not exceed 100 equivalents, based on the complex (page 16, lines 30-31). Under these conditions, though, it is impossible to carry out an emulsion polymerization.

It is disclosed, moreover, that complexes of the formula D

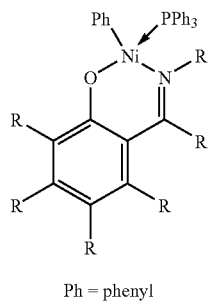

Ph = phenyl having identical or different radicals R are capable of polymerizing ethylene in the presence of small amounts of water (WO 98/42664, especially page 17, lines 14 et seq.). These amounts of water, however, must not exceed 100 equivalents, based on the complex (page 17, lines 33-35). Under these conditions, though, it is impossible to carry out an emulsion polymerization.

The preparation of aqueous dispersions with the aid of transition metal catalysts is also described in EP-A 1110977 and WO 01/44325.

Furthermore, the two laid-open specifications DE-A 2923206 and DE-A 3345785 each describe processes for preparing polyethylene using catalysts referred to as in situ catalysts, consisting of a nickel compound and a mixture of a quinonoid compound and also a tertiary phosphine. Neither of these documents, however, discloses that these catalysts can be used to prepare aqueous dispersions containing polyethylene.

In view of the great commercial importance of polyolefins, the search for improved processes for polymerization continues to be of great importance.

SUMMARY OF THE INVENTION

It is an object of the invention to provide an improved process which
  polymerizes olefins in the presence of large amounts of water to give polyolefins,
  produces materials with very low levels of branching and with high molecular weights, and
  allows this reaction to be carried out under industrially reasonable conditions.
It is a further object to use
  the process of the invention to prepare aqueous polyolefin dispersions and
  these polyolefin dispersions for paper applications (coating and surface sizing), base materials for paints and varnishes, adhesive base materials (including pressure sensitive adhesives), applications to textiles and leather, in chemicals used in the construction industry, foam moldings (mattresses, coatings for carpet backings), and also for medical and pharmaceutical products.
We have found that these objects are achieved by the process defined at the outset.

DETAILED DESCRIPTION OF THE PREFERRED EMBODIMENTS

Suitable olefins for the polymerization include: ethylene, propylene, 1-butene, 1-pentene, 1-hexene, 1-heptene, 1-octene, 1-decene and 1-eicosene, and also branched olefins such as 4-methyl-1-pentene, vinylcyclohexene, and vinylcyclohexane, and also styrene, para-methylstyrene and para-vinylpyridine, preference being given to ethylene and propylene. Ethylene is particularly preferred.

The copolymerization of two olefins is also possible with the process of the invention, the comonomer being selectable from the following groups:

1-olefins such as ethylene, propylene, 1-butene, 1-pentene, 1-hexene, 1-heptene, 1-octene, 1-decene and 1-eicosene, and also branched olefins such as 4-methyl-1-pentene, vinylcyclohexene, and vinylcyclohexane, and also styrene, para-methylstyrene, and para-vinylpyridine, preference being given to propylene, 1-butene, 1-pentene, 1-hexene, 1-heptene, 1-octene, and 1-decene;

internal olefins such as norbornene, norbornadiene or cis- or trans-2-butene;

polar monomers such as acrylic acid, acrylic acid $C_1$-$C_8$ alkyl ester, 2-hydroxyethyl acrylate, 3-hydroxypropyl acrylate, 4-hydroxybutyl acrylate, methacrylic acid, methacrylic acid $C_1$-$C_8$ alkyl esters, $C_1$-$C_6$ alkyl vinyl ethers, and vinyl acetate; preference is given to acrylic acid, methyl acrylate, ethyl acrylate, n-butyl acrylate, 2-ethylhexyl acrylate, 2-hydroxyethyl acrylate, methyl methacrylate, ethyl methacrylate, n-butyl methacrylate, ethyl vinyl ether, and vinyl acetate.

The ratio of the two monomers may be chosen freely. It is preferred, however, for the comonomer to be used in fractions of from 0.1 to 20 mol %, based on the principal monomer.

In the ligands of the formulae Ia and Ib the radicals are defined as follows:

R is selected from in each case one or more of the following radicals:
  hydrogen
  halogens, i.e., atoms of fluorine, chlorine, bromine or iodine, preference being given to fluorine, chlorine, and bromine
  nitrile
  $C_1$-$C_{12}$ alkyl groups such as methyl, ethyl, n-propyl, iso-propyl, n-butyl, iso-butyl, sec-butyl, tert-butyl, n-pentyl, iso-pentyl. sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-decyl, and n-dodecyl; preferably $C_1$-$C_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, and sec-hexyl, with particular preference $C_1$-$C_4$ alkyl such as methyl, ethyl, n-propyl, iso-propyl, n-butyl, iso-butyl, sec-butyl, and tert-butyl
  $C_1$-$C_{12}$ alkoxy groups such as the examples listed for $C_1$-$C_{12}$ alkyl groups but with the addition of an oxygen atom at the end of the group (for example, methoxy, ethoxy, n-propyloxy, iso-propyloxy, n-butyloxy)
  $C_7$-$C_{13}$ aralkyl groups such as, for example, $C_7$ to $C_{12}$ phenylalkyl such as benzyl, 1-phenethyl, 2-phenethyl, 1-phenylpropyl, 2-phenylpropyl, 3-phenylpropyl, neophyl (1-methyl-1-phenylethyl), 1-phenylbutyl, 2-phenylbutyl, 3-phenylbutyl, and 4-phenylbutyl, with particular preference benzyl;

$C_6$-$C_{14}$ aryl groups such as, for example, phenyl, 1-naphthyl, 2-naphthyl, 1-anthryl, 2-anthryl, 9-anthryl, 1-phenanthryl, 2-phenanthryl, 3-phenanthryl, 4-phenanthryl, and 9-phenanthryl, preferably phenyl, 1-naphthyl, and 2-naphthyl, with particular preference phenyl amino groups $NR^1R^2$, $R^1$ and $R^2$ together or separately being hydrogen, $C_1$-$C_{12}$ alkyl groups, $C_7$-$C_{13}$ alkyl radicals or $C_6$-$C_{14}$ aryl groups (in each case as defined above) and additionally being able to form a saturated or unsaturated 5- to 10-membered ring; preference here is given to the dimethylamino, the diethylamino, the diisopropylamino, the methylphenylamino, and the dimethylamino group. Examples of amino groups of saturated rings are the N-piperidyl group and the N-pyrrolidinyl group; examples of amino groups with unsaturated rings are the N-pyrryl group, the N-indolyl group, and the N-carbazolyl group.

The abovementioned radicals of $C_1$-$C_{12}$ alkyl, $C_1$-$C_{12}$ alkoxy, $C_7$-$C_{13}$ aralkyl, $C_6$-$C_{14}$ aryl, and $NR^1R^2$ amino groups may in each case be present in unsubstituted form on the quinonoid parent structure of the formulae Ia and Ib. They may also themselves additionally carry one or else more of the following substituents on their own molecular framework:

halogens $C_1$-$C_{12}$ alkyl groups, $C_1$-$C_{12}$ alkoxy groups, amino groups with hydrogen and/or $C_1$-$C_{12}$ alkoxy groups such as defined above in each case;

$C_3$-$C_{12}$ cycloalkyl groups such as cyclopropyl, cyclobutyl, cyclopentyl, cyclohexyl, cycloheptyl, cyclooctyl, cyclononyl, cyclodecyl, cycloundecyl, and cyclododecyl; preference is given to cyclopentyl, cyclohexyl, and cycloheptyl;

$C_1$-$C_{12}$ thioether groups such as methylmercaptyl, ethylmercaptyl, n-propylmercaptyl, iso-propylmercaptyl, n-butylmercaptyl, iso-butylmercaptyl, tert-butylmercaptyl, n-pentylmercaptyl, iso-pentylmercaptyl, neo-pentylmercaptyl, and n-hexylmercaptyl;

carboxyl groups, where appropriate in the form of their salts, preferably their alkali metal salts, in particular in the form of their lithium, sodium or potassium salts and also their ammonium salts sulfo groups, where appropriate in the form of their salts, preferably their alkali metal salts, in particular in the form of their lithium, sodium or potassium salts and also their ammonium salts.

It is also possible to use compounds of the formulae Ia and Ib which are connected to one another by one or more $C_1$-$C_{12}$ alkylene bridges, in particular by one or more $C_2$-$C_{10}$ alkylene bridges, with particular preference by one or more $C_3$-$C_8$ alkylene bridges, or by one or more $C_2$-$C_{12}$ alkylated azo bridges, in particular by one or more $C_4$-$C_{10}$ alkylated azo bridges.

Furthermore, identical or different compounds of the formulae Ia and Ib may also be connected by bridges of the formula II

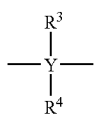

II where Y is silicon or germanium and $R^3$ and $R^4$ are hydrogen and/or $C_1$-$C_{12}$ alkyl. For this purpose it is preferred to use silicon-based bridges.

Selected ligands of the formula Ia which are especially suitable are pictured below as formulae $Ia_1$ to $Ia_{17}$:

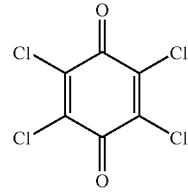

$Ia_1$

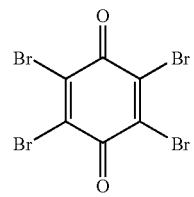

$Ia_2$

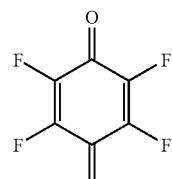

$Ia_3$

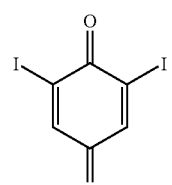

$Ia_4$

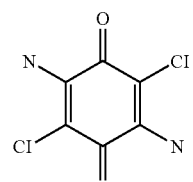

$Ia_5$

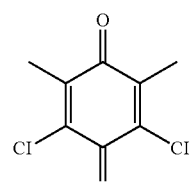

$Ia_6$

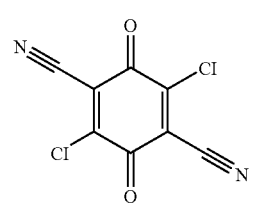

$Ia_7$

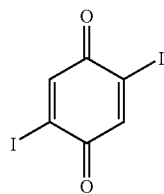
Ia8
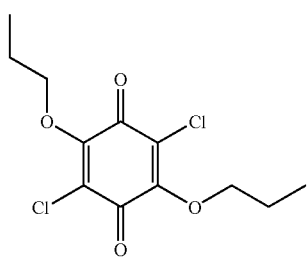
Ia14
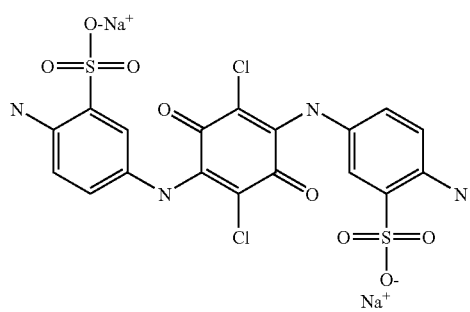
Ia9
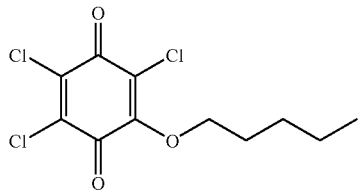
Ia15
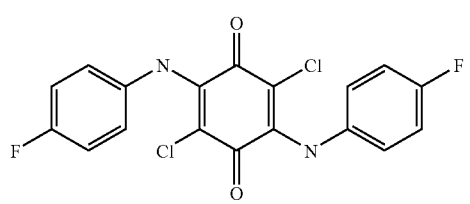
Ia10
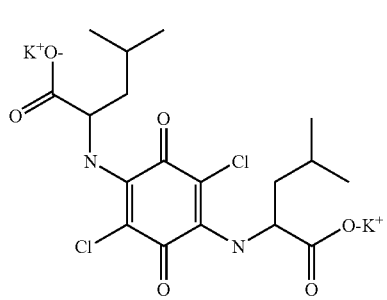
Ia16
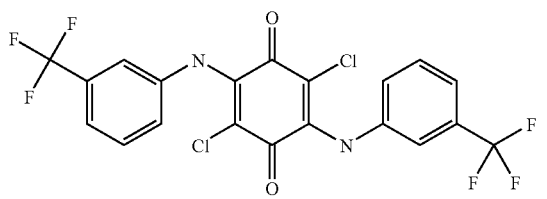
Ia11
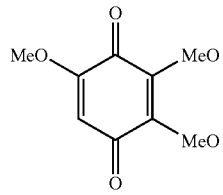
Ia12
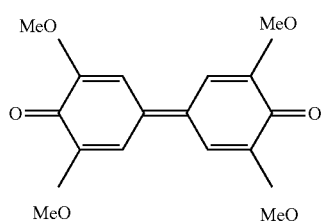
Ia17
Particularly suitable ligands of the formula Ib are pictured below as formulae Ib$_1$ and Ib$_2$:
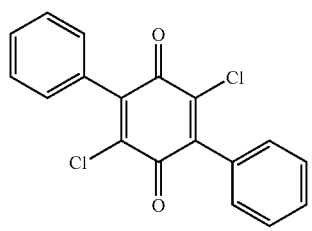
Ia13
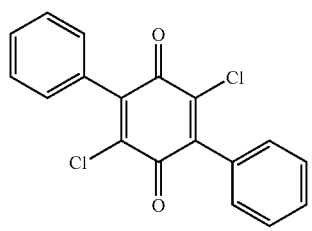
Ib$_1$

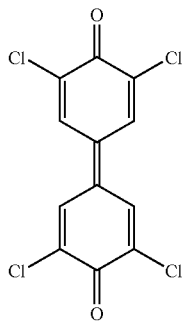

Particularly suitable ligands composed of two or more bridge-connected compounds of the formula Ia are pictured below as formulae Ia$_I$ and Ia$_{II}$.

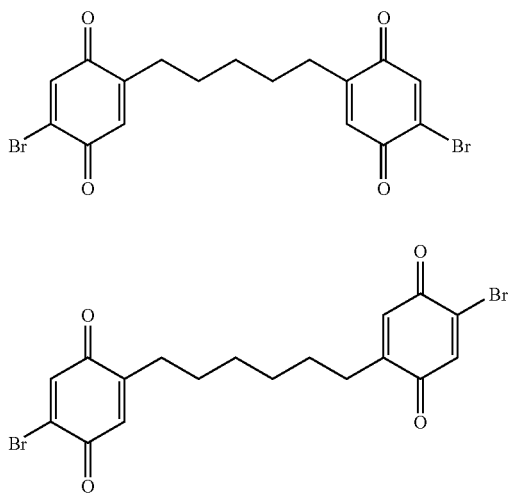

The synthesis of the ligands of the formulae Ia and Ib is known per se. Synthesis procedures for such ligands can be found, inter alia, in DE-A 2923206, EP-A 046331, EP-A 046328, and EP-A 052929.

The ligands Ia and Ib can be used in mixtures in ratios from 0:100 to 100:0 mol %. Preferred embodiments are 0:100 mol %, 10:90 mol %, 50:50 mol %, 90:10 mol % and 100:0 mol %.

The ligands of the formulae Ia and Ib are combined with a phosphine compound PR'$_3$, where R' is hydrogen, $C_1$-$C_{12}$ alkyl, $C_4$-$C_{12}$ cycloalkyl, $C_7$-$C_{15}$ aralkyl or $C_6$-$C_{15}$ aryl groups.

For examples of particularly preferred substituents, refer to the listings for the radical R in the formulae Ia and Ib.

A particularly preferred phosphine compound used is triphenylphosphine.

Instead of the phosphine compound PR'$_3$ it is also possible to use the diphosphine compound R'$_2$P-G-PR'$_2$, where R' has the same definition as for the phosphine compounds PR'$_3$ and G stands for $C_1$-$C_{12}$ alkyl, $C_4$-$C_{12}$ cycloalkyl, $C_7$-$C_{15}$ aralkyl or $C_6$-$C_{15}$ aryl groups.

Phosphine compounds of these kinds can be prepared in accordance with customary syntheses of organic chemistry and are also available commercially.

As well as with the phosphine compound, the ligands of the formulae Ia and Ib are also combined with one or more metal compounds of the formula M(L$^2$)$_2$ or M(L$^2$)$_2$(L$^1$)$_z$. In these formulae the variables are defined as follows:

L$^1$ is selected from phosphanes of the formula (R$^5$)$_x$PH$_{3-x}$ or amines of the formula (R$^5$)$_x$NH$_{3-x}$, where x is an integer between 0 and 3. However, ethers (R$^5$)$_2$O such as diethyl ether or tetrahydrofuran, H$_2$O, alcohols (R$^5$)OH such as methanol or ethanol, pyridine, pyridine derivatives of the formula C$_5$H$_{5-x}$(R$^5$)$_x$N, such as 2-picoline, 3-picoline, 4-picoline, 2,3-lutidine, 2,4-lutidine, 2,5-lutidine, 2,6-lutidine or 3,5-lutidine, CO, $C_1$-$C_{12}$ alkyl nitriles or $C_6$-$C_{14}$ aryl nitriles, are also suitable, such as acetonitrile, propionitrile, butyronitrile or benzonitrile. It is additionally possible for ethylenically mono- or polyunsaturated double bond systems to serve as ligands, such as ethenyl, propenyl, cis-2-butenyl, trans-2-butenyl, cyclohexenyl or norbornanyl.

R$^5$ is selected from hydrogen, $C_1$-$C_{20}$ alkyl groups, which may in turn be substituted by O($C_1$-$C_6$ alkyl) or N($C_1$-$C_6$ alkyl)$_2$ groups, $C_3$-$C_{12}$ cycloalkyl groups, $C_7$-$C_{13}$ aralkyl radicals, and $C_6$-$C_{14}$ aryl groups; specific examples of these groups can be found in the definition of the radical R.

L$^2$ is selected from
halide ions such as fluoride, chloride, bromide, or iodide, preferably chloride and bromide,
amines (R$^6$)$_x$NH$_{3-x}$, where x is an integer between 0 and 3 and R$^6$ is $C_1$-$C_{12}$ alkyl,
$C_1$-$C_6$ alkyl anions such as Me—, (C$_2$H$_5$)—, (C$_3$H$_7$)—, (n-C$_4$H$_9$)—, (tert. —C$_4$H$_9$)— or (C$_6$H$_{14}$)—;
allyl anions or methallyl anions,
benzyl anions, or
aryl anions such as (C$_6$H$_5$)—.

M is a transition metal from groups 7 to 10 of the Periodic System of the Elements; preference is given to manganese, iron, cobalt, nickel or palladium, and particular preference to nickel.

z is an integer from 0 to 4.

In one particular embodiment L$^1$ and L$^2$ are linked to one another by one or more covalent bonds. Examples of such ligands are 1,5-cyclooctadienyl ("COD"), 1,6-cyclodecenyl, and 1,5,9-all-trans-cyclododecatrienyl ligands.

In a further particular embodiment L$^1$ is tetramethylethylenediamine.

Especially preferred metal compounds are Ni(COD)$_2$ and Ni(CH$_3$)$_2$(TMEDA).

The conditions for the reaction of the ligand or ligands of the formulae Ia and Ib with the metal compound and with the phosphine compound are not critical per se. They are commonly reacted at from 0 to 100° C. in a solvent selectable from aliphatic and aromatic hydrocarbons such as, for example, n-heptane, toluene, ethylbenzene, ortho-xylene, meta-xylene or para-xylene. Chlorobenzene as well is a suitable solvent, and also ketones such as acetone, cyclic or noncyclic ethers such as diethyl ether, diisopropyl ether, 1,4-dioxane or tetrahydrofuran, water or alcohols such as methanol or ethanol, for example. Molar ratios of metal compound to phosphine compound which have been found suitable are from 1:1000 to 1000:1, preferably from 1:10 to 10:1, and with particular preference from 1:2 to 2:1. The molar ratio of the ligand or ligands Ia or Ib to the phosphine compound is likewise from 1:1000 to 1000:1, preferably from 1:10 to 10:1, in particular from 1:2 to 2:1.

It is possible here to react the metal compound with the chosen organic ligand and the phosphine compound outside of the polymerization reactor and then to introduce the reaction solution into the polymerization reactor.

The reaction of metal compound, phosphine compound, and ligand may also take place within the polymerization reactor, in which case it may be of advantage to add other substances at this point as well, such as further solvents, monomers for polymerization, and other auxiliaries, such as activators or emulsifiers, for example.

The choice of reaction conditions depends in each case on the substances used. Particularly in the case of precursors sensitive to water it has proven advantageous to react the precursors outside of the polymerization reactor first and then to meter the reaction product into the polymerization reactor.

This approach is likewise advantageous when the precursors do not dissolve fully in the solvent used, but of course the reaction product does.

The complexes formed in situ are not isolated and purified.

The complexes produced in situ are ideally suited to use in the polymerization or copolymerization of olefins in water or in a solvent mixture with a water content of at least 50% by volume. The polymerization is conducted optionally in the presence of an activator and optionally in the presence of an emulsifier.

It is further advisable to use an activator in addition in order to increase the activity. The activator may comprise olefin complexes of rhodium or of nickel.

Preferred nickel-(olefin)$_y$ complexes, available commercially from Aldrich, are $Ni(C_2H_4)_3$, $Ni(1,5\text{-cyclooctadiene})_2$ or "$Ni(COD)_2$", $Ni(1,6\text{-cyclodecadiene})_2$, and $Ni(1,5,9\text{-all-trans-cyclododecatriene})_2$. Particular preference is given to $Ni(COD)_2$.

Mixed ethylene/1,3-dicarbonyl complexes of rhodium are particularly suitable, for example, rhodium acetylacetonate ethylene or $Rh(acac)(CH_2=CH_2)_2$, rhodium benzoylacetonate-ethylene $Rh(C_6H_5\text{—}CO\text{—}CH\text{—}CO\text{—}CH_3)(CH_2=CH_2)_2$, or $Rh(C_6H_5\text{—}CO\text{—}CH\text{—}CO\text{—}C_6H_5)(CH_2=CH_2)_2$. The most suitable is $Rh(acac)(CH_2=CH_2)_2$. This compound can be synthesized in accordance with the formulation of R. Cramer from Inorg. Synth. 1974, 15, 14.

In some cases, activation can be brought about by ethylene. The readiness of the activating reaction depends critically on the nature of the ligand $L^1$. Thus it has been possible to show that, when $L^1$ is, for example, a tetramethylethylenediamine ligand, there is no need for an activator.

The polymerization of the 1-olefins by the process of the invention may be conducted in a manner known per se.

The sequence of addition of the reagents during the polymerization is not critical. For instance, first of all gaseous monomer can be injected into the solvent or liquid monomer metered in, and the mixture of ligand, phosphine compound, and metal compound added subsequently. Alternatively, the mixture of ligand, phosphine compound, and metal compound can first be diluted with further solvent and then monomer can be added.

At the same time the activator, where necessary, is dissolved in a second portion of the same solvent or else in acetone.

The polymerization itself normally runs at a minimum pressure of 1 bar; below this pressure, the polymerization rate is too low. Preference is given to 2 bar and particular preference to a minimum pressure of 10 bar.

4000 bar may be stated as a maximum pressure; at higher pressures, the requirements imposed on the material from which the polymerization reactor is constructed are very stringent, and the process becomes uneconomic. Preference is given to 100 bar and particular preference to 50 bar.

The temperature of polymerization may be varied within a wide range. 10° C. may be specified as a minimum temperature, since at low temperatures the polymerization rate declines. Preference is given to a minimum temperature of 40° C. and with particular preference 65° C. A sensible maximum temperature is 350° C. and preferably 150° C., with particular preference 100° C. Suitable organic solvents include aromatic solvents such as benzene, toluene, ethylbenzene, ortho-xylene, meta-xylene, and para-xylene, and also mixtures thereof. Also suitable are cyclic ethers such as tetrahydrofuran and dioxane or acyclic ethers such as diethyl ether, di-n-butyl ether, di-isopropyl ether or 1,2-dimethoxyethane. Ketones as well, such as acetone, methyl ethyl ketone or diisobutyl ketone, are suitable, as are amides such as dimethylformamide or dimethylacetamide. Mixtures of these solvents with one another are suitable, furthermore, as are mixtures of these solvents with water or alcohols such as methanol or ethanol.

Preference is given to acetone and water and to mixtures of acetone and water, the mixing ratio being arbitrary.

The amount of the solvent is likewise not critical, although it is necessary to ensure that the complex formed in situ and the activator can be dissolved completely; otherwise, activity losses are likely. The dissolution process may be accelerated, where appropriate, by means of ultrasound.

The emulsifier likewise to be added may be dissolved in a third portion of the solvent or else together with the ligand or the metal compound.

The amount of emulsifier is chosen such that the mass ratio between monomer and emulsifier is more than 1, preferably more than 10, and with particular preference more than 20. The smaller the amount of emulsifier that need be used, the better.

The ligands of the formulae Ia and Ib may act per se as emulsifiers. The activity in the polymerization is greatly increased, however, if an additional emulsifier is added. This emulsifier may be ionic or nonionic in nature.

Examples of customary nonionic emulsifiers are ethoxylated mono-, di- and tri-alkylphenols (EO units: 3 to 50, alkyl: $C_4$-$C_{12}$) and also ethoxylated fatty alcohols (EO units: 3 to 80; alkyl: $C_8$-$C_{36}$). Examples of such are the Lutensol® grades from BASF AG or the Triton® grades from Union Carbide.

Customary anionic emulsifiers are, for example, alkali metal salts and ammonium salts of alkyl sulfates (alkyl: $C_8$ to $C_{12}$), of sulfuric monoesters with ethoxylated alkanols (EO units: 4 to 30, alkyl: $C_{12}$-$C_{18}$) and with ethoxylated alkylphenols (EO units: 3 to 50, alkyl: $C_4$-$C_{12}$), of alkylsulfonic acids (alkyl: $C_{12}$-$C_{18}$), and of alkylarylsulfonic acids (alkyl: $C_9$-$C_{18}$)

Suitable cationic emulsifiers are generally $C_6$-$C_{18}$-alkyl-, -aralkyl- or heterocyclyl-containing primary, secondary, tertiary or quaternary ammonium salts, alkanolammonium salts, pyridinium salts, imidazolinium salts, oxazolinium salts, morpholinium salts, thiazolinium salts, and also salts of amine oxides, quinolinium salts, isoquinolinium salts, tropylium salts, sulfonium salts, and phosphonium salts. Examples that may be mentioned include dodecylammonium acetate or the corresponding hydrochloride, the chlorides or acetates of the various 2-(N,N,N-trimethylammonium)ethylparaffinic esters, N-cetylpyridinium chloride, N-laurylpyridinium sulfate, and N-cetyl-N,N,N-trimethylammonium bromide, N-dodecyl-N,N,N-trimethylammonium bromide, N,N-distearyl-N,N-dimethylammonium chloride, and the gemini surfactant N,N'-(lauryldimethyl)ethylenediamine dibromide. Numerous further examples can be found in H. Stache, Tensid-Taschenbuch, Carl-Hanser-Verlag, Munich, Vienna, 1981 and in McCutcheon's, Emulsifiers & Detergents, MC Publishing Company, Glen Rock, 1989.

As the polymerization reactor, stirred tanks and autoclaves and also tube reactors have proven useful, it being possible for the tube reactors to be configured as loop reactors.

The monomer or monomers to be polymerized is or are mixed in the polymerization medium. The polymerization medium used may comprise water or mixtures of water with the solvents listed above. It should be ensured that the fraction of water is at least 50% by volume, based on the total mixture, preferably at least 90% by volume, and with particular preference at least 95% by volume.

The solutions of the complex generated in situ, of the activator where appropriate, and of the emulsifier where appropriate, are combined with the mixture of monomer and aqueous polymerization medium. The sequence in which the various components are added is not critical per se. It is, however, necessary for the components to be combined with sufficient rapidity that there is no crystallization of any low-solubility complex intermediates that may be formed.

Suitable polymerization methods include in principle both continuous and batchwise methods. Preference is given to semicontinuous methods (semibatch methods), in which, after all the components have been mixed, monomer or monomer mixtures are metered in supplementarily in the course of the polymerization.

The process of the invention initially produces aqueous polymer dispersions.

The average diameters of the polymer particles in the dispersions of the invention are between 10 and 1000 nm, preferably between 50 and 500 nm, and with particular preference between 70 and 350 nm. The distribution of the particle diameters may, but need not necessarily, be very uniform. For certain applications, particularly for those with high solids contents (>55%), broad or bimodal distributions are in fact preferred.

The aqueous dispersions of the invention may also be present in the form of a miniemulsion, which means that the emulsified particles have a diameter of from 50 nm to 150 nm, in particular from 70 nm to 100 nm. To prepare such a miniemulsion the emulsified particles are subjected to strong shearing. Strong shearing of this kind can be achieved, inter alia, by means of high-pressure homogenization, ultrasound or else jet dispersers. It is preferred in this case to operate with ultrasound.

The polymers obtained by the process of the invention have industrially advantageous properties. In the case of polyethylene, they may exhibit a high degree of crystallinity, something which can be demonstrated, for example, by the number of branchings. Frequently less than 40 branchings, preferably less than 20 branchings, and with particular preference less than 10 branchings are found per 1000 carbon atoms in the polymer, as determined by $^1$H-NMR and $^{13}$C-NMR spectroscopy.

The molecular weight distributions of the polyolefins obtainable by the process of the invention, i.e., the Q values, are situated between 1.0 and 50 and, preferably, between 1.5 and 10. The molar masses of the polyolefins obtained are situated within the range from 1000 to 1 000 000, in particular in the range from 100 000 to 3000 (numerical averages).

An advantage of the dispersions of the invention, in addition to the favorable price arising from the inexpensive monomers and process, is that they are more stable to weathering than dispersions of polybutadiene or butadiene copolymers. As compared with dispersions of polymers comprising acrylates or methacrylates as principal monomer, the reduced tendency toward hydrolysis is an advantage. A further advantage is that the majority of olefins are highly volatile and unpolymerized, residual monomers are easily removed. Finally, it is an advantage that there is no need to add molar mass regulators during the polymerization, such as tert-dodecyl mercaptan, for example, which first are difficult to separate off and secondly have an unpleasant odor. It is also favorable that the aqueous dispersions obtained from the process of the invention have relatively high solids contents of up to 20%.

From the aqueous dispersions obtained initially, the polymer particles per se can be obtained by removing the water and, where present, the organic solvent or solvents. A large number of common techniques are suitable for such removal, examples including filtration, spray drying or evaporation. The polymers thus obtained have a good morphology and a high bulk density.

The particle size can be determined by light scattering methods. An overview can be found in D. Distler (editor) "WäBrige Polymerdispersionen", Wiley-VCH Verlag, 1st edition, 1999, chapter 4.

The dispersions prepared in accordance with the invention can be used advantageously in numerous applications, such as paper applications such as paper coating or surface sizing, and also paints and varnishes, construction chemicals, adhesive base materials, foam moldings, applications to textiles and leather, coatings for carpet backings, mattresses or pharmaceutical applications.

By paper coating is meant the coating of the paper surface with aqueous pigmented dispersions. The dispersions prepared in accordance with the invention are advantageous on account of their favorable price. Surface sizing is the pigment-free application of hydrophobicizing substances. As particularly hydrophobic substances, the polyolefin dispersions specifically are of advantage, having been difficult to obtain to date under economic conditions. A further advantage is that, during the inventive preparation of the dispersions for paper coating or surface sizing, there is no need to add any molar mass regulators such as tert-dodecyl mercaptan, for example, which on the one hand are difficult to separate off and on the other hand have an unpleasant odor.

In paints and varnishes, the dispersions prepared in accordance with the invention are particularly suitable on account of their favorable pricing. Of particular advantage are aqueous polyethylene dispersions, since they additionally possess high UV stability. Moreover, aqueous polyethylene dispersions are particularly suitable on account of their resistance to basic chemicals, which are customary in the construction industry.

In adhesives, particularly in adhesives for self-adhesive labels or films and also patches, but also in construction adhesives or industrial adhesives, the dispersions prepared in accordance with the invention have economic advantages. In construction adhesives in particular they are especially favorable, since they are resistant to basic chemicals, which are common in the construction industry.

In foam moldings, which can be produced from the dispersions prepared in accordance with the invention by processes which are known per se, such as the Dunlop process or the Talalay process, the favorable price of the inventive dispersions is again of advantage. Further components include gelling agents, soaps, thickeners, and vulcanizing pastes. Foam moldings are processed, for example, into mattresses.

Applications made to textiles and leather serve to preserve and ennoble textile or leather. Examples of the effects imparted include impregnation and further finishing of the textiles. An advantageous feature of the dispersions prepared in accordance with the invention, when used as part of applications to textiles and leather, in addition to the favorable price, is the freedom from odor, since residual olefin monomers are easily removed.

Coatings on carpet backing serve to bond the carpet fibers to the backing, and also have the function of giving the carpet the necessary stiffness and of effecting uniform distribution of additives such as flame retardants or antistats, for example. An advantageous feature of the dispersions prepared in accordance with the invention, besides the favorable price, is their lack of sensitivity to the customary additives. Polyethylene dispersions in particular have proven particularly inert chemically. A final advantage is that, during the preparation of the dispersions in accordance with the invention for coatings on carpet backings, there is no need to add molar mass regulators such as tert-dodecyl mercaptan, for example, which on the one hand are difficult to separate off and on the other hand have an unpleasant odor.

By pharmaceutical preparations are meant dispersions as vehicles for drugs. Dispersions as drug vehicles are known per se. An advantage of the dispersions prepared in accordance with the invention as drug vehicles is the economically favorable price and the resistance to physiological influences such as gastric fluid or enzymes.

WORKING EXAMPLES

General notes: The syntheses, unless otherwise described, were carried out in accordance with the Schlenk technique in the absence of air and moisture.

The molar masses of the polymers obtained were determined by means of GPC.

In accordance with DIN 55672, the conditions chosen were as follows: solvent: 1,2,4-trichlorobenzene; flow rate: 1 ml/min; temperature: 140° C. Measurement was carried out on a Waters 150C instrument which had been calibrated using polyethylene standards.

The solids content was determined by precipitating the polyethylene from methanol.

Example 1

Starting from 2,3,5,6-tetrachloro-p-benzoquinone 64 mg (258 µmol) of 2,3,5,6-tetrachloro-p-benzoquinone and 68 mg (258 µmol) of triphenylphosphine were dissolved in 1 ml of methanol (dried and degassed), 4 ml of toluene (dried and degassed) and 0.3 ml of hexadecane (degassed). The solution obtained was stirred for 20 minutes, during which it turned orange in color. The solution was then introduced into another Schlenk flask, which contained 79 mg (287 µmol; 1.11 eq) of nickel-(cyclooctadiene)$_2$ [Ni(cod)$_2$].

In the interim, a solution of 1 g of sodium dodecyl sulfate [SDS] in 95 ml of degassed and deionized water was prepared. 75 ml of this aqueous solution were introduced directly into the reactor, the other 20 ml were added to the catalyst mixture and subjected to ultrasound treatment (120 W, 2 minutes). The miniemulsion obtained in this way was then introduced into the reactor using a hollow Teflon needle.

The reactor was subsequently filled with ethylene, setting a constant ethylene pressure of 40 bar, and at the same time the interior of the reactor was heated to 70° C. with stirring (1000 rpm). After a reaction time of 2 hours, the polymerization was terminated by cooling and releasing the ethylene.

The aqueous latex obtained had a solids content of 18% (determined by precipitating 7.1 g of polyethylene from the latex using 40 ml of methanol). The polyethylene obtained had a molar mass (number-average) of 6200, the weight average being approximately 18 000.

Example 2

Starting from 2,3,5,6-tetrachloro-p-benzoquinone 64 mg (258 µmol) of 2,3,5,6-tetrachloro-p-benzoquinone and 68 mg (258 µmol) of triphenylphosphine were dissolved in 1 ml of methanol (dried and degassed), 4 ml of toluene (dried and degassed) and 0.3 ml of hexadecane (degassed). The solution obtained was stirred for 20 minutes, during which it turned orange in color. The solution was then introduced into another Schlenk flask, which contained 79 mg (287 µmol; 1.11 eq) of nickel-(cyclooctadiene)$_2$ [Ni(cod)$_2$].

In the interim, a solution of 1 g of SDS in 95 ml of degassed and deionized water was prepared. 75 ml of this aqueous solution were introduced directly into the reactor, the other 20 ml were added to the catalyst mixture and subjected to ultrasound treatment (120 W, 2 minutes). The miniemulsion obtained in this way was then introduced into the reactor using a hollow Teflon needle.

The reactor was subsequently filled with but-1-ene, setting a constant but-1-ene pressure of 10 bar, and at the same time the interior of the reactor was heated to 70° C. with stirring (1000 rpm). After 30 minutes the but-1-ene was replaced by ethylene, which was under a constant pressure of 40 bar.

After a further reaction time of 1.5 hours, the polymerization was terminated by cooling and releasing the ethylene.

The aqueous latex obtained had a solids content of 8% (determined by precipitating 13.01 g of copolymer of ethylene and but-1-ene from the latex using methanol).

Example 3

Starting from 2,3,5,6-tetrabromo-p-benzoquinone 64 mg (258 µmol) of 2,3,5,6-tetrabromo-p-benzoquinone and 68 mg (258 µmol) of triphenylphosphine were dissolved in 1 ml of methanol (dried and degassed), 4 ml of toluene (dried and degassed) and 0.3 ml of hexadecane (degassed). The solution obtained was stirred for 20 minutes, during which it turned orange in color. The solution was then introduced into another Schlenk flask, which contained 79 mg (287 µmol; 1.11 eq) of Ni(cod)$_2$.

In the interim, a solution of 1 g of SDS in 95 ml of degassed and deionized water was prepared. 75 ml of this aqueous solution were introduced directly into the reactor, the other 20 ml were added to the catalyst mixture and subjected to ultrasound treatment (120 W, 2 minutes). The miniemulsion obtained in this way was then introduced into the reactor using a hollow Teflon needle.

The reactor was subsequently filled with ethylene, setting a constant ethylene pressure of 40 bar, and at the same time the interior of the reactor was heated to 40° C. with stirring (1000 rpm). After a reaction time of 2 hours, the polymerization was terminated by cooling and releasing the ethylene.

The aqueous latex obtained had a solids content of 9% (determined by precipitating 3.4 g of polyethylene from the latex using 40 ml of methanol).

We claim:

1. A process for emulsion polymerization of one or more olefins, comprising:
   i) preparing a catalyst by reacting a) a ligand of the formula Ia or Ib or a mixture of at least two of the ligands Ia or Ib with b-1) a phosphine compound PR'$_3$, wherein R' is hydrogen, $C_1$-$C_{12}$ alkyl, $C_4$-$C_{12}$ cycloalkyl, $C_7$-$C_{15}$ aralkyl or $C_6$-$C_{15}$ aryl group, and c) a metal compound of the formula M(L$^2$)$_2$ or M(L$^2$)$_2$(L$^1$)$_z$, wherein the formulas of the ligands Ia and Ib (a) are as follows:

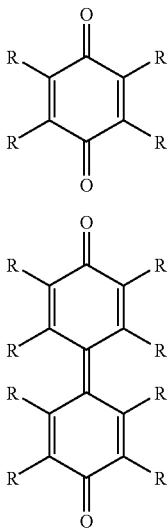

wherein each R substituent represents one or more of the following radicals: hydrogen, halogen, nitrile; or $C_1$-$C_{12}$ alkyl, $C_1$-$C_{12}$ alkoxy, $C_7$-$C_{13}$ aralkyl, $C_6$-$C_{14}$ aryl groups, each optionally substituted by $C_1$-$C_{12}$ alkyl groups, halogens, $C_1$-$C_{12}$ alkoxy, $C_3$-$C_{12}$ cycloalkyl, $C_1$-$C_{12}$ thioether groups, or carboxyl groups or sulfo groups, each being in its acid or salt form, or amino and/or $C_1$-$C_{12}$ alkyl substituted amino groups;

amino groups $NR^1R^2$, where $R^1$ and $R^2$ together or separately are hydrogen, $C_1$-$C_{12}$ alkyl, $C_7$-$C_{13}$ aralkyl or $C_6$-$C_{14}$ aryl groups and may additionally form a saturated or unsaturated 5- to 10-membered ring, unsubstituted or substituted by $C_1$-$C_{12}$ alkyl groups, halogens, $C_1$-$C_{12}$ alkoxy, $C_3$-$C_{12}$ cycloalkyl, $C_1$-$C_{12}$ thioether groups, or carboxyl groups or sulfo groups, each being in its acid or salt form, or amino and/or $C_1$-$C_{12}$ alkyl substituted amino groups; and wherein identical or different compounds of the formulae Ia and Ib optionally are bridged by one or more $C_1$-$C_{12}$ alkylene, $C_2$-$C_{12}$ alkylated azo or formula II bridging moieties, said formula II having the structure:

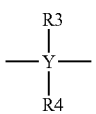

wherein Y is silicon or germanium and $R^3$ and $R^4$ are hydrogen and/or $C_1$-$C_{12}$ alkyl; and wherein the definitions of the metals and L groups in the metal compounds are as follows:

M is a transition metal selected from the group consisting of Groups 7 to 10 of the Periodic Chart of the Elements;

$L^1$ is phosphanes $(R^5)_xPH_{3-x}$ or amines $(R^5)_xNH_{3-x}$ with identical or different radicals $R^5$, ethers $(R^5)_2O$, $H_2O$, alcohols $(R^5)OH$, pyridine, pyridine derivatives of the formula $C_5H_{5-x}(R^5)_xN$, CO, $C_1$-$C_{12}$ alkyl nitriles, $C_6$-$C_{14}$ aryl nitriles or ethylenically unsaturated double bond systems, x being an integer from 0 to 3;

$R^5$ is hydrogen, $C_1$-$C_{20}$ alkyl groups, which may in turn be substituted by $O(C_1$-$C_6$ alkyl) or $N(C_1$-$C_6$ alkyl$)_2$ groups, $C_3$-$C_{12}$ cycloalkyl groups, $C_7$-$C_{13}$ aralkyl radicals, or $C_6$-$C_{14}$ aryl groups, $L^2$ is halide ions or $R^6_xNH_{3-x}$, where x is an integer from 0 to 3 and $R^6$ is $C_1$-$C_{12}$ alkyl or $C_1$-$C_6$ alkyl anions, allyl anions, benzyl anions or aryl anions, and optionally $L^1$ and $L^2$ being linked to one another by one or more covalent bonds; and z is a number from 0 to 4; and ii) immediately (co)polymerizing one or more olefins in water or a solvent mixture with a water content of at least 50% by volume in the presence of an emulsifier and, optionally, of an activator.

2. A process as claimed in claim 1, wherein one or more olefins are emulsion polymerized as a miniemulsion in water, produced with the aid of ultrasound.

3. A process as claimed in claim 1, wherein said activator is present in the (co)polymerization medium.

4. A process as claimed in claim 3, wherein said activator is an olefin complex of rhodium or of nickel.

5. A process as claimed in claim 3, wherein said emulsifier is an ionic emulsifier.

6. A process as claimed in claim 1, wherein one of said olefins is ethylene.

7. A process as claimed in claim 1, wherein one olefin is ethylene and the comonomer is selected from propylene, 1-butene, 1-hexene and styrene.

8. A process as claimed in claim 1, wherein the olefin for polymerization is ethylene.

9. The process as claimed in claim 1, wherein said ligands Ia to Ib are combined in a ratio of 10:90 to 90 to 10 mole %.

10. The process as claimed in claim 1, wherein the metal compound is combined with the phosphine in a molar ratio ranging from 1:1000 to 1000:1.

11. The process as claimed in claim 1, wherein the ligand Ia or Ib is combined with the phosphine compound in a molar ratio ranging from 1:1000 to 1000:1.

* * * * *